United States Patent [19]

Fenoglio et al.

[11] Patent Number: 5,476,160
[45] Date of Patent: Dec. 19, 1995

[54] DOUBLE-WRAP BRAKE BAND ASSEMBLY

[75] Inventors: Robert J. Fenoglio, New Lenox; Steven P. Geary, Joliet; Christopher P. Puchalla, Lombard; Anthony J. Grzesiak, Sauk Village; David T. Vierk, Landsing; Allen C. Mayhew, Oak Forest, all of Ill.

[73] Assignee: Borg-Warner Automotive, Inc., Sterling Heights, Mich.

[21] Appl. No.: 162,495

[22] Filed: Dec. 3, 1993

Related U.S. Application Data

[63] Continuation-in-part of Ser. No. 6,324, Jan. 19, 1993, abandoned, and Ser. No. 960,994, Oct. 14, 1992, abandoned, which is a continuation of Ser. No. 784,537, Oct. 29, 1991, abandoned.

[51] Int. Cl.⁶ .................................................... F16D 65/00
[52] U.S. Cl. ................................. 188/77 W; 188/250 H; 188/259
[58] Field of Search .............................. 188/77 R, 77 W, 188/250 H, 259, 249; 192/81 R, 107 T; 411/504, 506; 29/524.1, 525.2, 520, 446, 505, 507

[56] References Cited

U.S. PATENT DOCUMENTS

| | | | |
|---|---|---|---|
| 2,663,270 | 12/1953 | Friedly | 411/504 |
| 2,841,864 | 7/1958 | Kelly | 29/418 |
| 2,867,898 | 1/1959 | Vosler et al. | 29/416 |
| 2,958,230 | 11/1960 | Haroldson | 411/504 X |
| 3,265,166 | 8/1966 | Lavengood | 192/107 T X |
| 3,386,535 | 6/1968 | Bishop et al. | 188/77 |
| 3,399,749 | 9/1968 | Baule | 188/259 |
| 3,828,517 | 8/1974 | Johnson | 29/505 |
| 4,363,385 | 12/1982 | Schlanger | 188/249 |
| 4,581,803 | 4/1986 | Blinks et al. | |
| 4,602,706 | 7/1986 | Blinks | |
| 4,757,880 | 7/1988 | Grzesiak | 188/77 W |
| 5,012,905 | 5/1991 | Tanaka | 188/250 H |
| 5,083,642 | 1/1992 | Stefanutti et al. | 188/77 W |
| 5,345,667 | 9/1994 | Coppier | 29/505 |
| 5,346,040 | 9/1994 | Puchalla et al. | 188/77 W |

FOREIGN PATENT DOCUMENTS

| | | | |
|---|---|---|---|
| 1248884 | 1/1989 | Canada | F16D 49/00 |
| 1248885 | 1/1989 | Canada | F16D 49/00 |
| 230727 | 8/1987 | European Pat. Off. | F16H 57/10 |
| 0230727 | 8/1987 | European Pat. Off. | F16H 57/10 |
| 0540156 | 5/1993 | European Pat. Off. | F16D 65/04 |
| 0544406 | 6/1993 | European Pat. Off. | 188/77 W |
| 2376338 | 9/1978 | France | 188/250 H |
| 2532349 | 2/1977 | Germany | F16D 65/04 |
| 0247829 | 10/1989 | Japan | 188/77 W |
| 2108014 | 5/1983 | United Kingdom | F16D 65/00 |
| WO9111635 | 8/1991 | WIPO | F16D 65/04 |

*Primary Examiner*—Mark T. Le
*Attorney, Agent, or Firm*—Emch, Schaffer, Schaub & Porcello Co.; Greg Dziegielewski

[57] ABSTRACT

An improved double-wrap brake band having a bracket member (16) consisting of an apply bracket (20), a reaction bracket (22), and a connector bracket (24) secured to three generally parallel bands (12A, 12B, 12C). The bands (12A, 12B, 12C) include a plurality of position oriented non-circular slots (36) designed to accept corresponding non-circular extruded tabs (44) extending from the bracket member (16). Each of the tabs has a longitudinal curvature that is substantially radially parallel to the annular inner peripheral surface (42) of the bracket member (44) and the annular inner peripheral surface (15) of the strap member (10). The tabs (44), after clinching, serve to retain the bracket member (16) securely on the bands (12A, 12B, 12C).

11 Claims, 14 Drawing Sheets

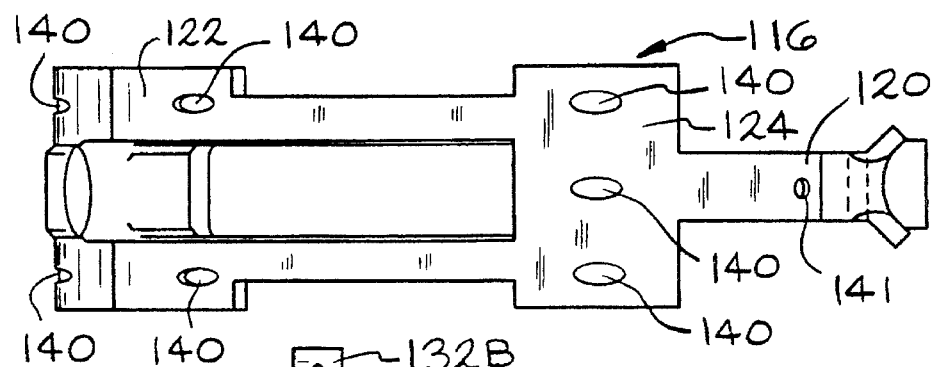
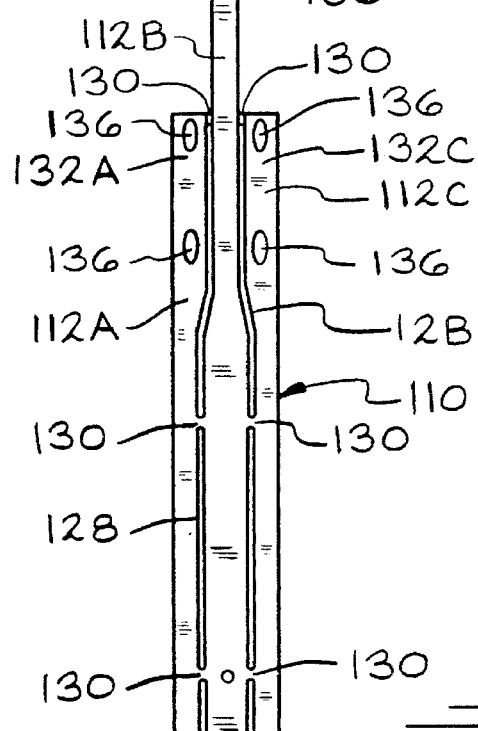
FIG. 8
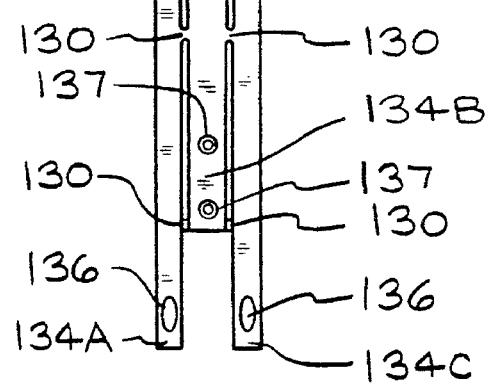
FIG. 9

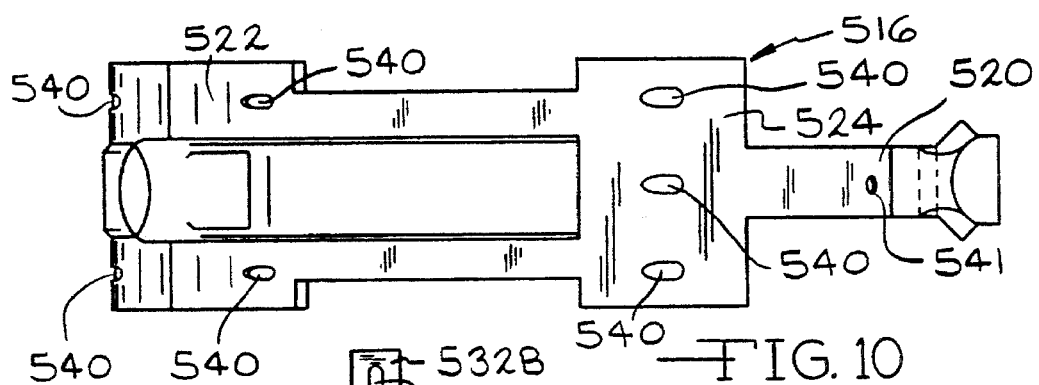
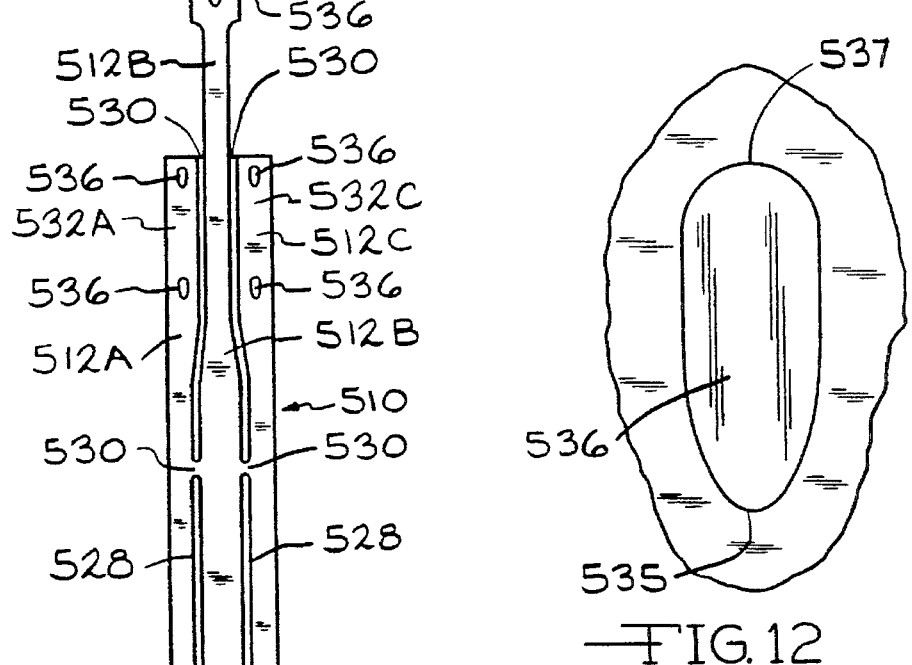
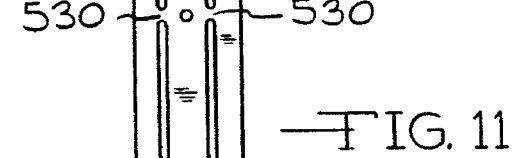
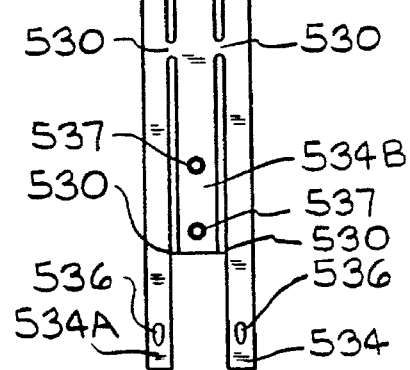

| | |
|---|---|
| A | +8.478E+04 |
| B | +7.479E+04 |
| C | +6.479E+04 |
| D | +5.480E+04 |
| E | +4.481E+04 |
| F | +3.482E+04 |
| G | +2.483E+04 |
| H | +1.483E+04 |

A +8.592E+04
B +7.569E+04
C +6.546E+04
D +5.523E+04
E +4.500E+04
F +3.477E+04
G +2.454E+04
H +1.431E+04

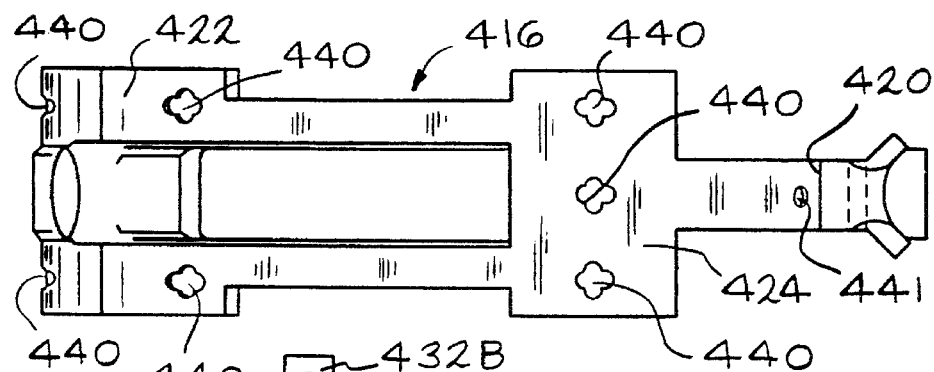
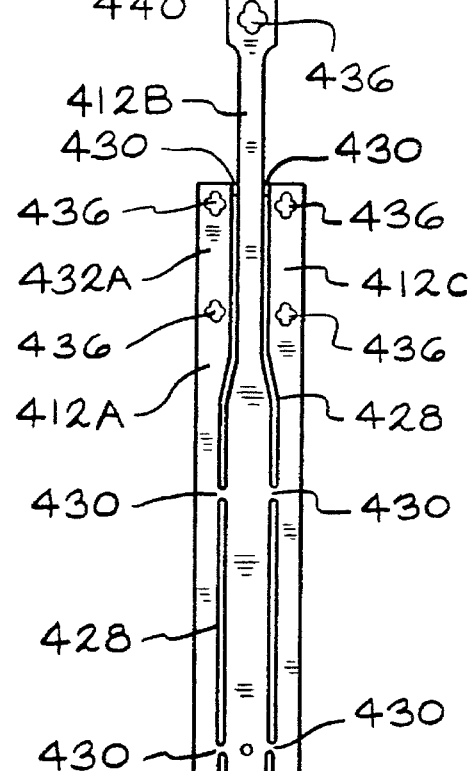
FIG. 26
FIG. 27

DOUBLE-WRAP BRAKE BAND ASSEMBLY

RELATED APPLICATIONS

This application is a continuation-in-part of application Ser. No. 006,324, filed Jan. 19, 1993 abandoned and application Ser. No. 960,994, filed Oct. 14, 1992 abandoned. Application Ser. No. 07/960,994 is a continuation of application Ser. No. 07/784,537, filed Oct. 29, 1991 abandoned. The subject matter of the '537 application, the '994 application and the '324 application is expressly incorporated herein by reference in their entirety.

BACKGROUND OF THE INVENTION

The present invention relates to an improved double-wrap brake band assembly having bracket members which are secured to the band strap without the use of secondary loose parts or the exposure of the band to high heat stress.

Commonly double-wrap brake bank assemblies are used in the automatic transmission of an automotive vehicle. Most conventional automatic transmissions are of the torque converter type wherein a driven shaft extends from the torque converter into the transmission to a clutch unit having one or more clutch drums. Double-wrap brake bands are positioned around the clutch drums and, with suitable hydraulic controls, effect gear changes to control the direction and speed of rotation of the output shaft or driveshaft extending from the transmission. Double-wrap brake bands have been widely utilized in such transmissions since they commonly provide more than twice the holding power of an otherwise similar single-wrap band.

Brake band assemblies must be designed to optimize performance over a variety of use specifications. For instance, the band must be able to provide a desired performance level when placed in operation in a gross overload mode commonly designated as Brute Force Holding Power. A typical performance specification in this mode of operation requires that the transmission band withstand the application of at least 100 cycles of shifting from a forward gear to a reverse gear at open throttle of 75% to 80% of maximum engine output on dry pavement. Another desired performance test, known as High Cycle Fatigue Loading, requires that the transmission band withstand the application of at least 70,000 cycles in one direction or gear at open throttle of at least 60% of maximum engine output.

Conventional double-wrap brake bands designed to meet these performance specifications are usually manufactured from a relatively thick metal strap which is formed into three generally parallel bands having an annular shape. Friction linings are applied to the inner diameter surface of the annular strap member. Bracket members for engaging the anchor pin and apply pin of the transmission are secured to the ends of the strap member. In some embodiments, such as those shown in U.S. Pat. Nos. 4,757,830 and 4,602,706, a unitary bracket member comprising both the apply bracket and the reaction bracket is welded to the strap assembly. As a final step on construction, the apply and reaction brackets are separated usually through the elimination of a tie member, to allow the apply bracket and reaction bracket to individually react to force applications received from the apply pin and anchor pin, respectively. Problems have been encountered, however, with the use of welding or brazing techniques for fixing the bracket members to a strap assembly. The heat stresses inflicted on the metal strap and bracket members by the intense heat of the welding or brazing process have sometimes caused distortion of the band structure and increased the potential for fractures of the heat-stressed metal during use of the band. Also, problems have been encountered with bands of this construction wherein the narrow apply bracket member which is secured to the center band does not have sufficient strength to withstand the forces applied during motor vehicle operation.

Another double-wrap band embodiment, such as that shown in U.S. Pat. No. 5,012,905 discloses a similar band structure having three parallel bands formed into an approximate annular shape with friction facings fastened to the inner peripheral surfaces of the bands. The bracket members are secured to the band member by rivets. Use of such rivets successfully reduces the distortion to the band caused by the heat stresses imposed by a brazing or welding operation and further acts to reduce the stresses to the band material caused by the welding heat. However, problems have been encountered in using rivets to secure bracket members to band members due to the inability of rivet designs to withstand the operational stresses imposed by transmission use. Further, the use of rivets to secure the brackets to bands imposes problems in manufacturing as a result of the multitude of loose parts required during the manufacturing process.

The double-wrap brake band of the present invention eliminates the disadvantages of these conventional double-wrap bands.

SUMMARY OF THE INVENTION

The present invention provides an improved double-wrap brake band which is assembled from a preformed and preslotted strap, a preslotted friction lining, and separate apply, reaction, and crossover members or a stamped one-piece bracket member integrating the apply, reaction, and crossover members wherein the members have specialized extrusions that fit into oriented prepunched slots located in the strap. The slots are designed to be of a variety of shapes, dependent upon the performance specification the band is intended to meet. The purpose of the extrusion and slot shape is to spread the stresses encountered by the slot over the greatest surface area, thereby reducing the load on any given area of the material around the slot. The variety of band configurations are numerous, including, but not limited to, slots which are round, oval elliptical, diamond, tear drop, or clover shaped. Other specialized shape designs include a four corner ellipse and a combination ellipse and oval hybrid. Other embodiments provide a stress hole longitudinally oriented with the prepunched slot. The apply and reaction members are provided with extrusions designed to mate with the longitudinal slots in the strap member and extend through the strap member wherein a final clinching process permanently secures the extrusion about the periphery of the slot.

It has been found that there is a certain hierarchy of applicability of the extrusion/strap hole configurations to meet end-use demands of the double-wrap band. The hierarchy is set by the need to simplify and optimize tooling considerations while achieving optimum performance characteristics. For instance round extrusions are the most readily tooled; however, round extrusions can only be used in applications having very low load levels due to their tendency to fail as a result of their large stress multiplier. A round strap hole can have a stress riser or multiplier at the hole edge of three (3) times the stress applied to the section. If higher load levels must be managed, an oval extrusion/strap hole having a stress multiplier of about two (2) may be used as well as the elliptical shape having a stress multiplier of about 1.5. A normal elliptical extrusions/strap hole combination performs well in the high cycle fatigue performance tests, however, it experiences corner shear when exposed to the gross overload brute holding power performance test. Thus, the elliptic/oval hybrid or ellipse with oval-shaped ends is utilized in an attempt to provide combined strength in both performance tests.

The double-wrap band manufactured in accordance with this structures provides the ability to maintain a lighter weight without reduced strength characteristics through the use of lighter gauge materials.

The band manufactured in accordance with this structure further simplifies manufacturing operations and reduces complexities in manufacturing operations by eliminating the need for loose parts during the assembly process.

The band manufactured in accordance with this invention further provides for improved bracket alignment on the strap members.

The double-wrap band manufactured in accordance with this invention eliminates the need for heat treatment of the band assembly and, therefore, provides for better conformity of the band to the transmission drums.

The band manufactured in accordance with this invention reduces the distortion of the band assembly caused by the extreme heat of welding.

The band of this invention will be more fully understood with reference to the attached drawings as described by the following description of the preferred embodiments.

DESCRIPTION OF THE DRAWINGS

FIG. 8 is an elevational view of an alternative embodiment of a single bracket assembly wherein the mating extrusions are elliptical in shape;

FIG. 9 is an elevational view of an alternative embodiment of a preslotted strap member of a double wrap band having mating slots elliptical in shape to receive the extrusions of the bracket assembly of FIG. 8;

FIG. 10 is an elevational view of a second alternative embodiment of a single bracket assembly where mating extrusions are boat shaped.

FIG. 11 is an elevational view of a second alternative embodiment of a preslotted strap member of a double wrap band having mating slots of a boat shape to receive the extrusions of the bracket assembly of FIG. 10;

FIG. 12 is a detail view of the boat shape slots as appears in the strap member of FIG. 11.

FIG. 26 is an elevational view of a fifth alternative embodiment of a single bracket assembly wherein the mating extrusions are clover shaped; and FIG. 27 is an elevational view of a fifth alternative embodiment of a preslotted strap member of a double wrap band having mating slots of a clover shape to receive the extrusions of the bracket assembly of FIG. 26.

DESCRIPTION OF THE PREFERRED EMBODIMENTS

Figure 1:
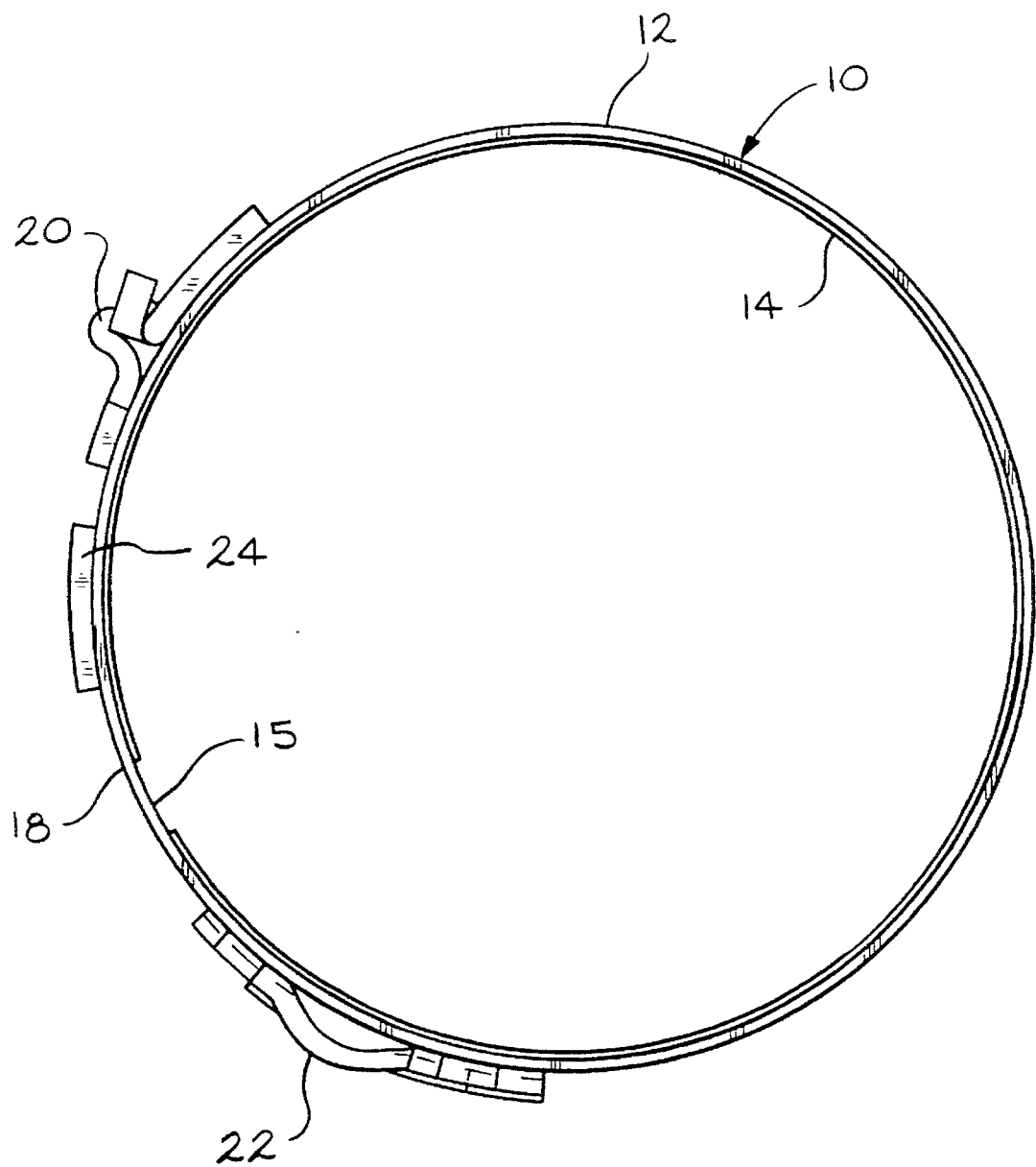
FIG. 1 is an elevational side view of the double-wrap band of the present invention.
Figure 2:
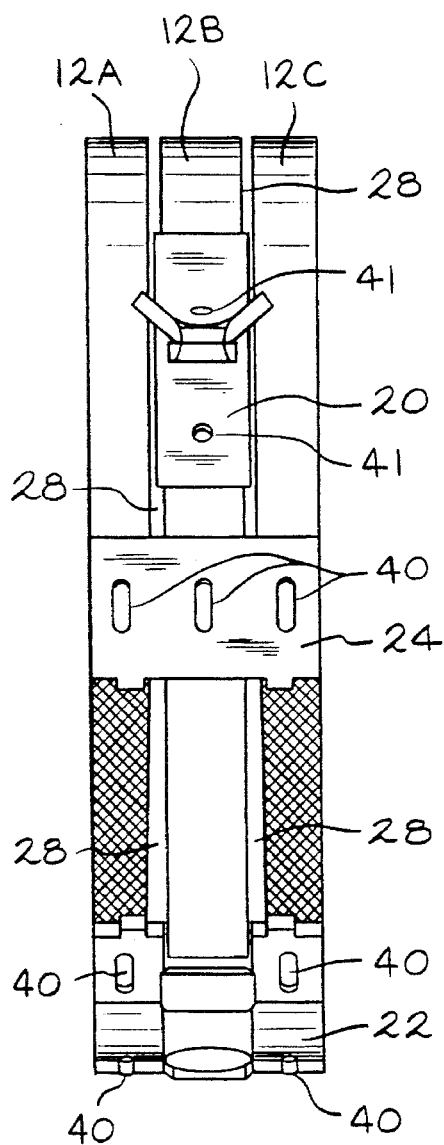
FIG. 2 is a top elevational view of the band and bracket assembly of FIG. 1.
Figure 5:
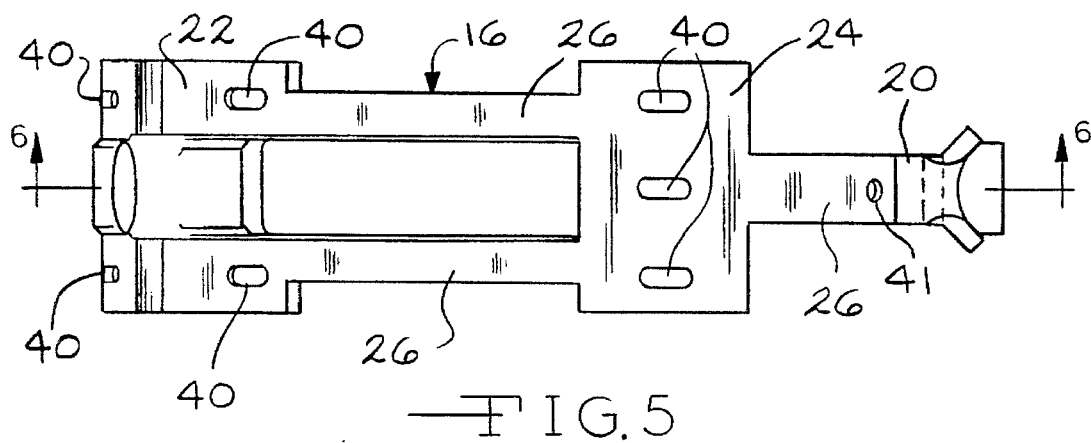
FIG. 5 is an elevational view of the single bracket assembly intended for use with the double-wrap band of this invention.
Figure 6:
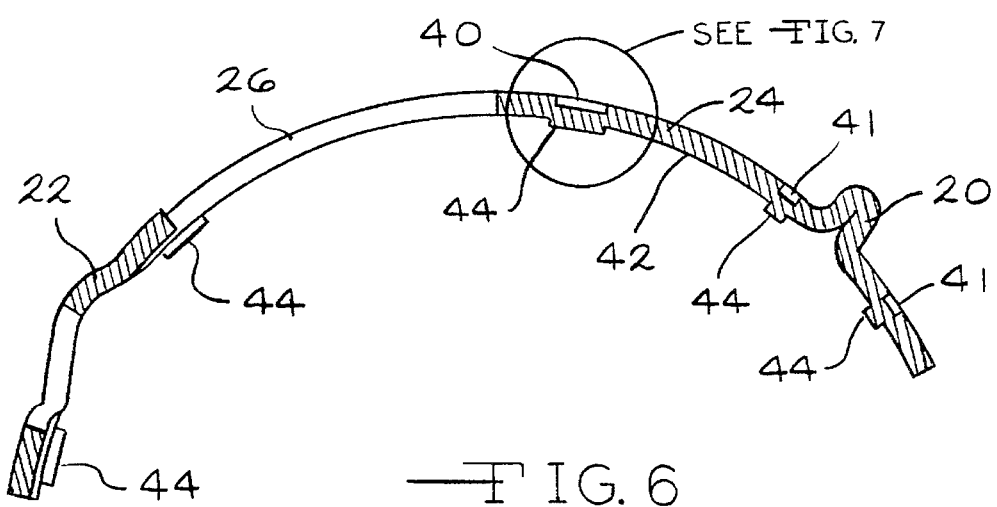
FIG. 6 is a sectional view taken along line 6—6 of FIG. 5.

Referring now to FIGS. 1–4, the double-wrap band having strap holes formed as ovals is shown in detail. The double-wrap band includes a strap member 10 which is composed of three bands 12A, 12B, 12C, longitudinally aligned and generally parallel to each other, forming a generally annular configuration. The preferable gauge of the material from which the strap member 10 is formed lies in the range of 0.040 inch to 0.100 inch. Preferably, the material used for the strap member 10 of the present invention is MartINSite™ steel, manufactured by the Inland Steel Corporation, in the gauge of 0.060 inch. As shown in FIG. 1, a friction lining 14 is adhered to the inner peripheral surface 15 of the three bands 12 by an acceptable method. A bracket member 16 is adhered to the outer peripheral surface 18 of the strap member 10. The bracket member 16 is preferably formed from 1536 SAE heat treated steel or, alternatively, HSLA non-heat treated steel. The bracket member 16 incorporates together an apply member 20 as shown in FIGS. 1 and 2, a reaction member 22 as shown in FIGS. 1 and 2, and a connector member 24 as shown in FIGS. 1 and 2. The three bracket members 20, 22, 24 are, preferably, integrally interconnected, as shown in FIGS. 5 and 6 by tie members 26. Alternatively, the apply member 20, reaction member 22 and connector member 24, may be individual components designed to be attached to the strap member 10.

Figure 3:
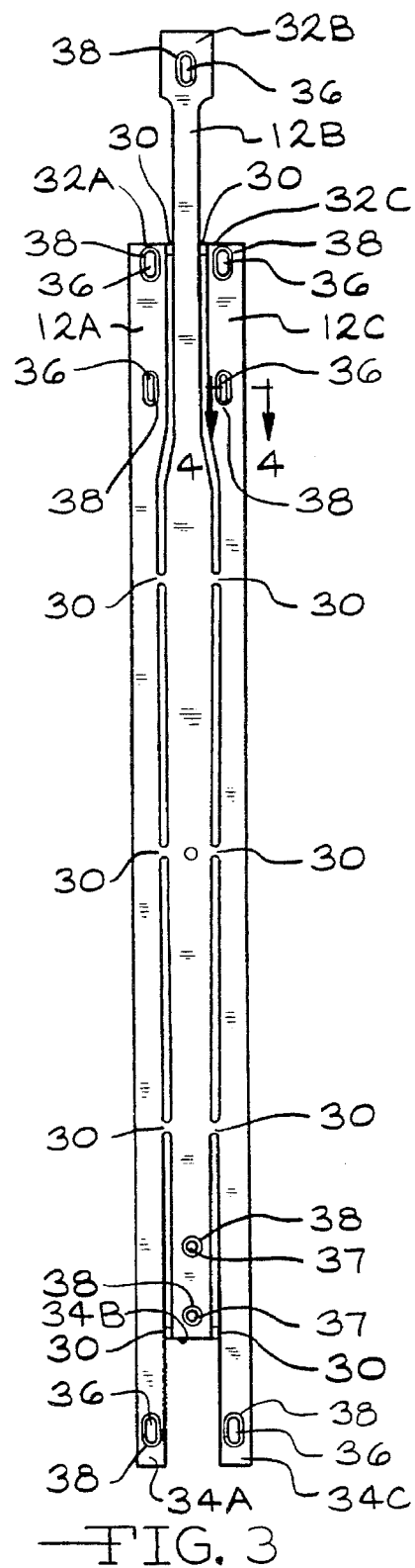
FIG. 3 is an elevational view of the preslotted strap member utilized in the double-wrap band of this invention.
Figure 16:
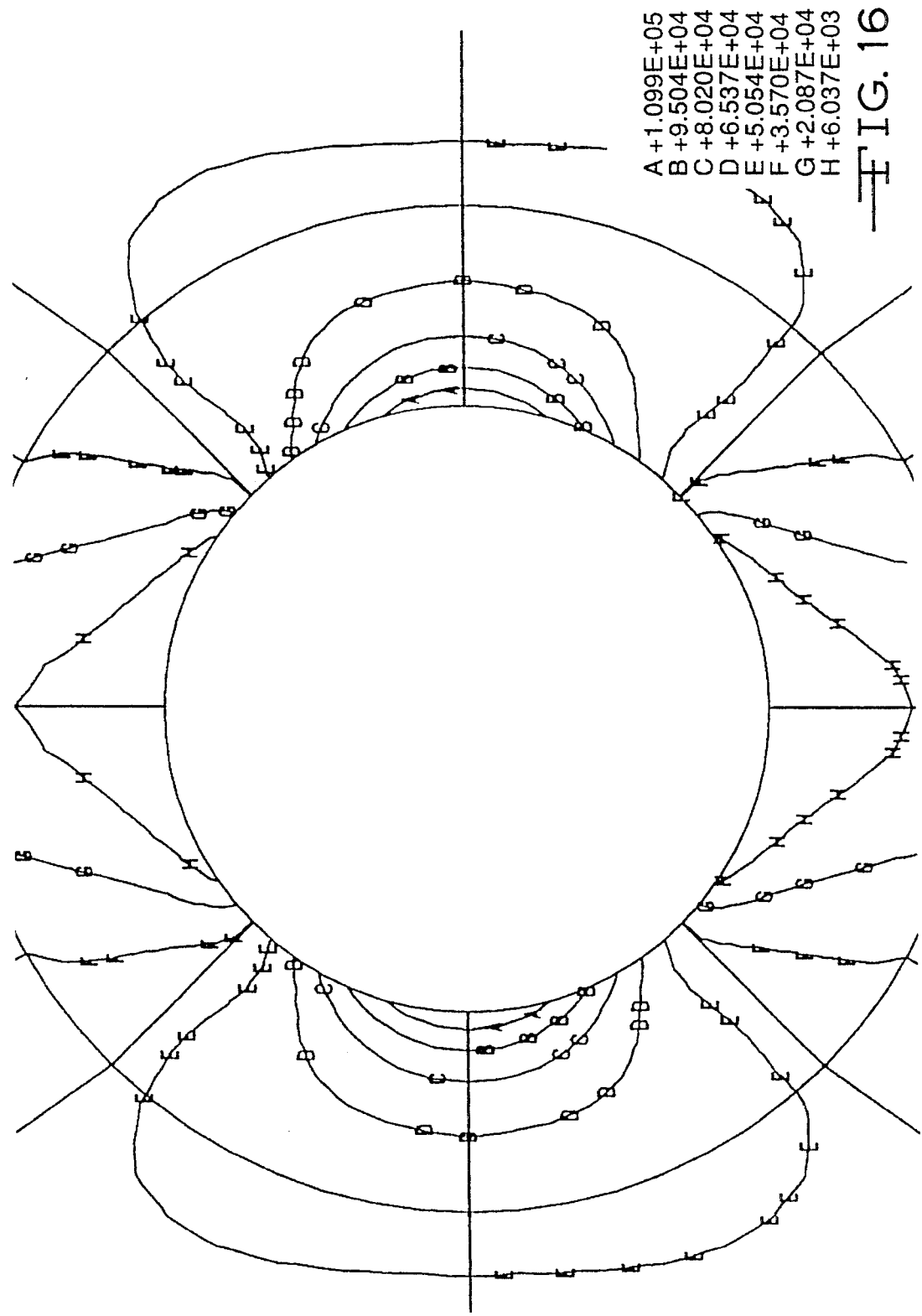
FIG. 16 is a diagrammatic view of stress level contours experienced by a round strap hole subjected to a load of 1000 pounds.
Figure 17:
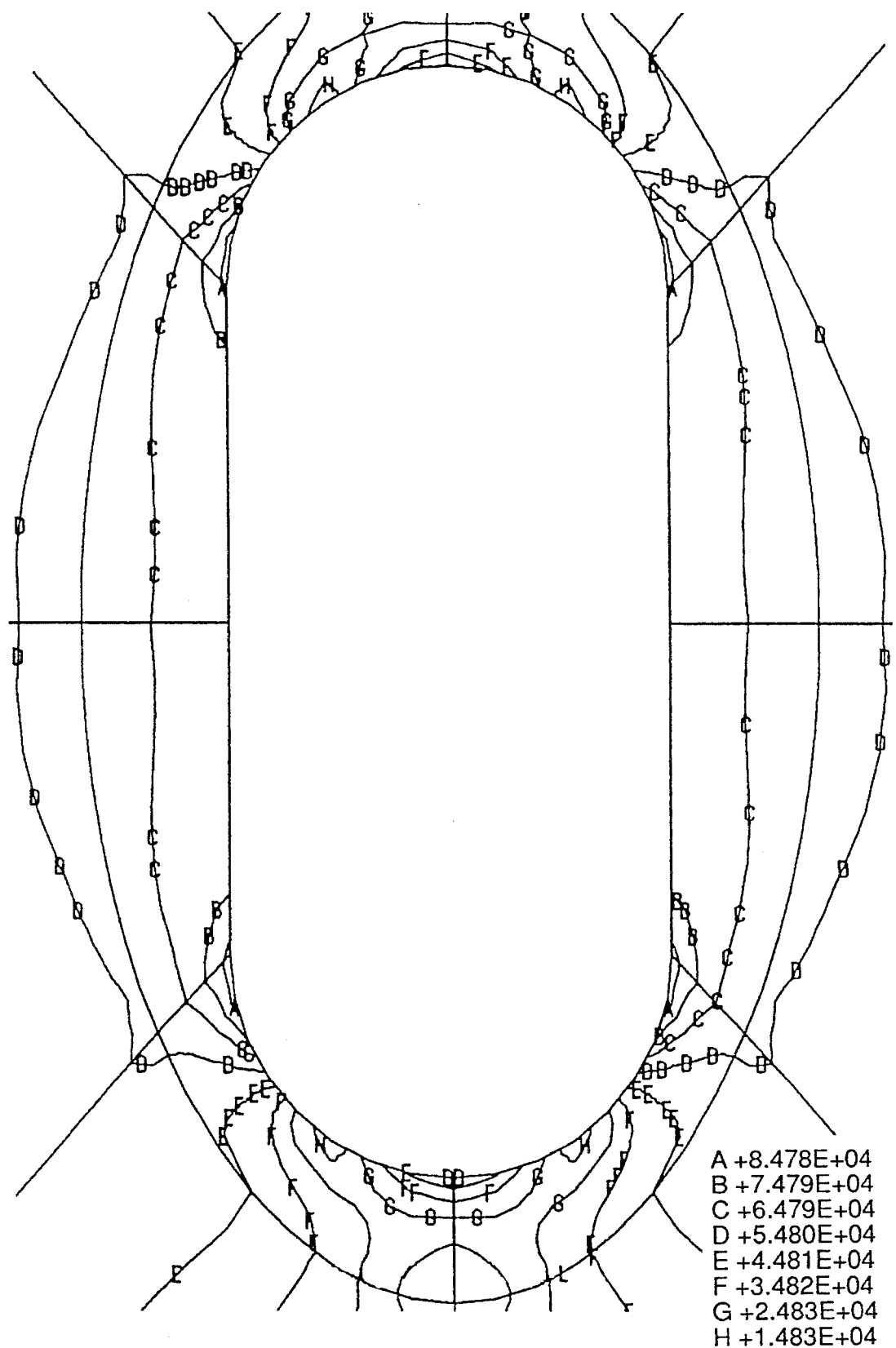
FIG. 17 is a diagrammatic view of stress level contours experienced by an oval strap hole subjected to a load of 1000 pounds.

Referring now specifically to FIG. 3, the structure of the strap member 10 utilized to secure the bracket member 16 to the strap member 10 is shown. The strap member 10 is manufactured so that the three generally parallel band members 12A, 12B, 12C are separated by longitudinally extending slots 28 which are separated by transversely aligned ties 30. One end 32B of the middle band member 12B extends beyond the ends 32A, 32C of the outside band members 12A, 12C. At the opposed end of the strap member 10, the opposed ends 34A, 34C of the outside band members 12A, 12C extend beyond the opposed end 34B of the middle band member 12B. Longitudinally oriented oval shaped slots 36 are located on the three band members 12A, 12B, 12C, extending therethrough. The slots 36 are of a generally squared oval configuration and extend longitudinally along the band members 12A, 12B, 12C to prevent any potential interference with the cross-sectional strength of the individual band members. As shown by the stress contours of FIG. 17, this longitudinal orientation, coupled with the shape of the slot serves to spread the stresses encountered by the slots over a large surface area, thereby greatly reducing the potential for premature failure of the brake band. The stress contours shown in FIG. 17 indicate that the highest stresses, occurring around the oval slot as the result of an application of a 1000 pound load in the principal direction, are found at contour lines A and are stretching forces equivalent to 8.478E+04 or 84,780 psi. This is comparatively lower than the round hole of FIG. 16 wherein the contour lines A are much more pronounced for the same applied load, showing stretching forces of 1.099E+05 or 109,900 psi.

Figure 4:
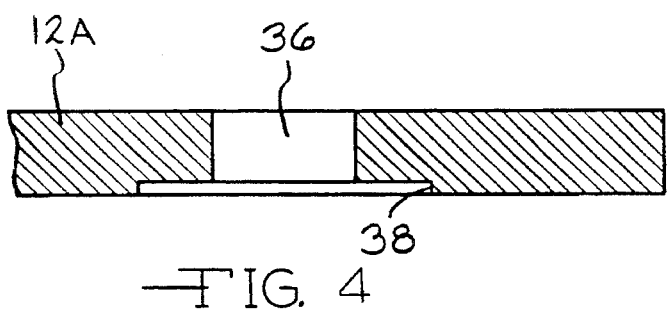
FIG. 4 is a sectional view taken along line 4—4 of FIG. 3.

Referring now to FIGS. 3 and 4, each slot 36 is, preferably, coined or stamped around its perimeter 38 to prestress the material around the perimeter of the slot 36, thereby enhancing the strength of the perimeter and limiting any stress fractures, which may occur during use of the band, to the prestressed perimeter 38 thereby preventing such stress fractures from progressing into the body of each band member 12A, 12B, 12C. In the embodiment shown in FIG. 3, the holes 37 to which the apply member 20 is attached are generally circular in shape and coined about its perimeter 38. However, it is envisioned that the shape of the holes 37 may also be designed in any shape to accommodate the stresses intended to be encountered by the apply bracket.

Figure 7:
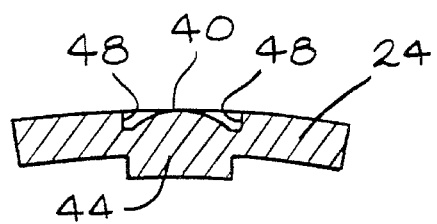
FIG. 7 is a detail view of an extrusion of the bracket member shown in FIG. 6.

Referring now to FIGS. 5–7, an embodiment of a one-piece bracket member 16 intended for use with the strap member 10 of FIG. 3 is shown in detail. Of course, the one-piece bracket member 16 may not be preferred in some applications and three individual elements—apply, reaction and connector members may be substituted, if desired. However, for the purposes of description, the bracket member 16 will be described as "one-piece". The one-piece bracket member 16 is formed to have generally the same radial curvature as the strap member 10. The one-piece bracket member 16 includes a reaction member 22, apply member 20, and connector member 24. The bracket member 16 includes a plurality of oval shaped longitudinal extrusions 40 located in the reaction member 22 and connector member 24. The apply member 20 includes a pair of circular extrusions 41. The extrusions 40, 41 are formed by locally extruding the bracket material through the inner peripheral surface 42 of the bracket member 16 to create a series of tabs 44. The tabs 44 are designed to mate with the slots 36 and hole 37 of the strap member 10 and extend therethrough. The tabs 44 may be tapered along their longitudinal sides 46 to enhance the ability of the tabs 44 to mate with the slots 36 and correctly position the bracket member 16 upon the strap member 10. The preferable clearance between the sides 46 of the tab 44 and the slot perimeter 38, after the bracket member 16 is correctly positioned upon the strap member 10, is 0.0015 inches/side. Further, as shown in detail in FIG. 7, the bracket member 16 is extruded so that the ends 48 of the longitudinally oriented oval extrusion are sunken deeper into the strap material to produce an extruded tab 44 having a longitudinal radial curvature which substantially parallels the radius of the strap member 10. Thus, since the extruded tabs 44 extend evenly through the material of the strap member 10, the fastening forces of the extruded tabs 44 are evenly distributed and enhanced, to prevent shearing of the extrusion during loading.

The bracket member 16 is oriented on the strap member 10 in the following manner. Referring to FIGS. 3, 5 and 6, the tabs 44 of the reaction member 22 are aligned with the slots 36 located at the ends 32A, 32C of the outside bands 12A, 12C. The tabs 44 of the apply member 20 are aligned with the holes 37 located at the end 34B of the middle band 12B. Since the bands 12A, 12B, 12C are annularly disposed as shown in FIGS. 1 and 2, the remaining slot 36 located at the end 32B of the middle band 12B will be transversely aligned with the remaining slots 36 located on the ends 34A, 34C of the outside bands 12A, 12C respectively. The tabs 44 of the connector member 24 are thus aligned with the slots 36 located at the ends 34A, 32B, 34C of the bands 12A, 12B, 12C respectively.

After the bracket member 16 is properly oriented on the strap member 10, the tabs 44 are clinched in any acceptable manner. For instance and preferably, the tabs 44 may be clinched by use of a longitudinally oriented centerline punch which cold-punches the tab 44 and spreads the portion of the tab extending through the slot 36 into an expanded and engaged position with the slot perimeter 38. The expanded tab will commonly form a bead which extends 2–3 mil outside of the inner perimeter 15 of the strap member 10. To prevent uneven wear of the brake band, the friction liner 14 is removed at the areas where the bead extends beyond the inner perimeter, thereby providing smooth engagement of the friction facing with the clutch drum.

After the bracket member 16 is fixed in place on the strap member 10, the tie members 26 are eliminated, thus separating the apply member 20, reaction member 22 and connector member 24. The transversely aligned ties 30 located between the band members 12A, 12B, and 12C are also eliminated. Thus, the only interconnection between the three ends, 12A, 12B, 12C, is through the connector member 24 which is engaged to the slots 36 located in the end 32B of the middle band 12B and the opposed ends 34A and 34C of the outside bands 12A, 12C.

The engagement between the bracket member 16 and strap member 10 may be further enhanced by providing a structural adhesive, such an epoxy which cures at the bonding temperature, the interface between the bracket member 16 and strap member 10.

Figure 18:
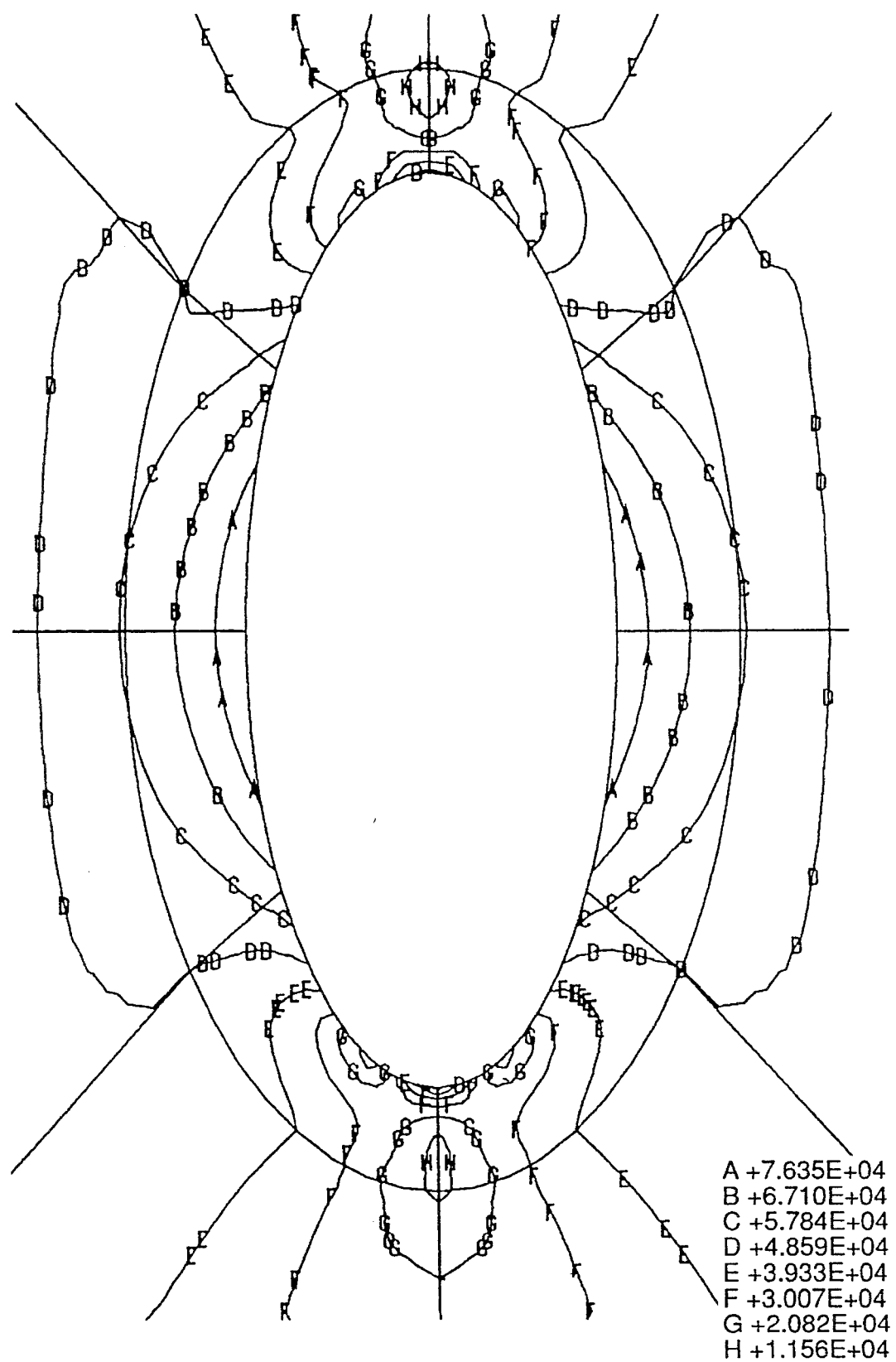
FIG. 18 is a diagrammatic view of stress level contours experienced by an elliptical strap hole subjected to a load of 1000 pounds.

Referring now specifically to FIGS. 8 and 9, an alternative embodiment of a one-piece bracket member 116 and corresponding strap member 110 is shown. The strap member 110 is generally manufactured to have the same structure as the strap member of FIG. 3. There are three generally parallel band members 112A, 112B, 112C which are separated by longitudinally extending slots 128 where are separated by transversely aligned ties 130. One end 132B of the middle band member 112B extends beyond the ends 132A, 132C of the outside band members 112A, 112C. At the opposed end of the strap member 110, the opposed ends 134A, 134C of the outside band members 112A, 112C extend beyond the opposed end 134B of the middle band member 112B. Longitudinally oriented elliptical slots 136 are located on the three band members 112A, 112B, 112C, extending therethrough. As shown in FIG. 18, the elliptical slots 136 are designed to spread the stresses encountered by the slots over a large surface area, thereby greatly reducing the potential premature failure of the brake band. The stress contours shown in FIG. 18 indicate that the highest stretching forces felt by the ellipse at contour lines A are equivalent to 7.65E+04 or 76,350 psi. As with the embodiment shown in FIG. 3, each slot 136 may be coined around its perimeter (not shown) to prestress the material around the perimeter of the slot 136 thereby providing the ability to limit any stress fractures which may occur in the prestressed perimeter during use of the band and prevent such stress fractures from progressing into the body of each band member 112A, 112B, 112C. Further, in the embodiment shown in FIG. 9, the holes 137 to which the apply member 120 is attached are generally circular in shape and coined. However, it is envisioned that such holes 137 may be designed to be longitudinal and elliptical in shape as are the remaining slots 136.

Referring now to FIG. 8, the one-piece bracket member intended for use with the band of FIG. 9 is shown in detail. The bracket member 116 has generally the same structure as the bracket member 116 described earlier with reference to FIG. 5 and is formed to have generally the same radial curvature as the strap member 110. The bracket member 116 includes a reaction member 122, apply member 120 and connector member 124. The bracket member 116 includes a plurality of elliptically shaped longitudinal extrusions 140 located in the reaction member 122 and connector member 124. The apply member 120 includes a pair of circular extrusions 141. The extrusions 140, 141 are formed by locally extruding the bracket material through the inner peripheral surface (not shown) of the bracket member 116 to create a series of tabs (not shown). Preferably the tabs are designed to mate with the slots 136 and holes 137 of the strap member 110 and extend therethrough. The tabs preferably have a clearance of 0.0015 inches per side with the slots 136, 137 to enhance the positioning of the bracket member 116 upon the strap member 110. The extruded tab members have the structural detail as described and shown in FIG. 7 and the manner in which the bracket member 116 is aligned with the band members 112A, 112B, 112C and the tabs are clinched to form a bead and fix the bracket member 116 to the strap member 110 is the same as that described earlier.

Figure 19:
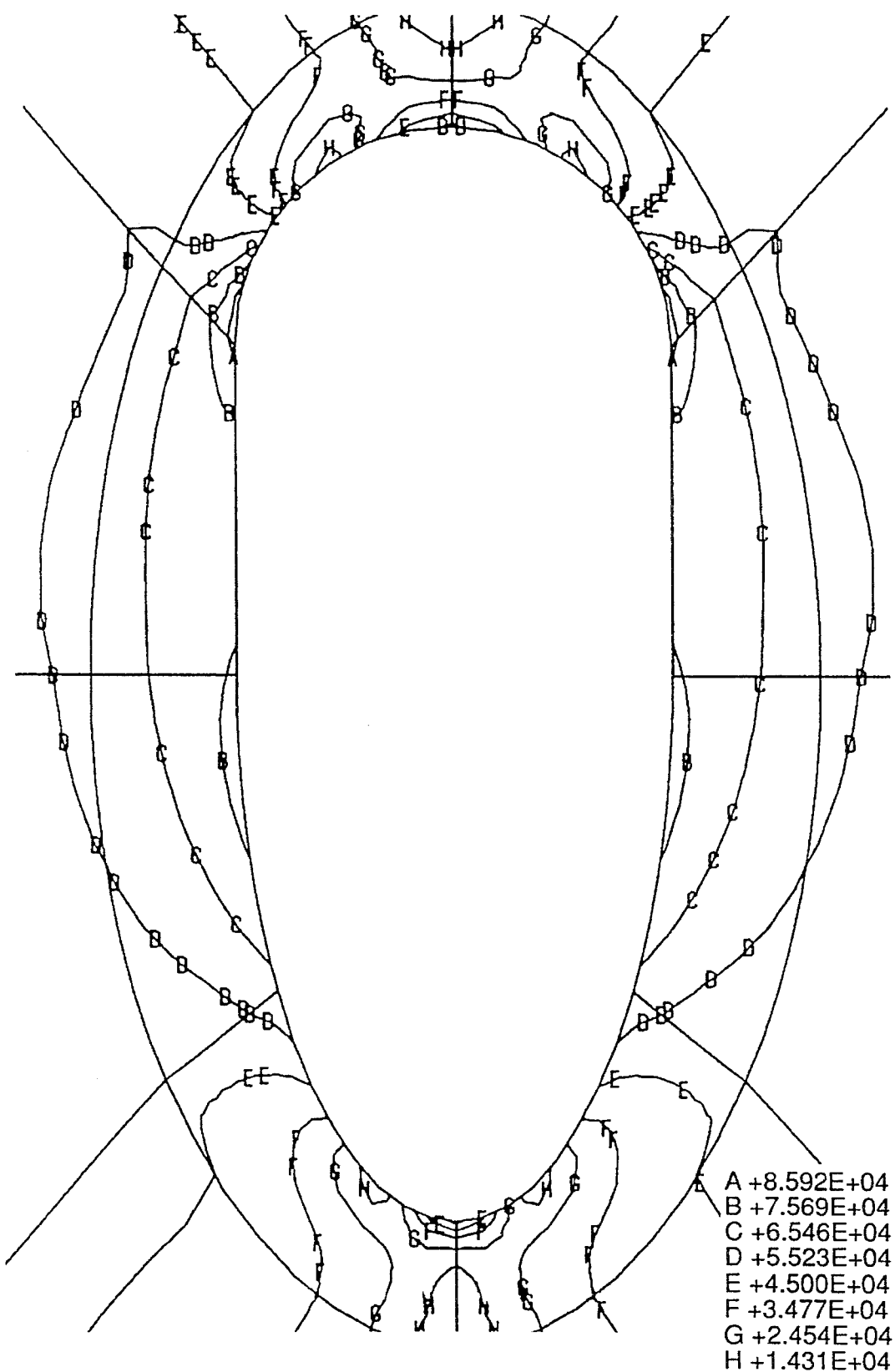
FIG. 19 is a diagrammatic view of stress level contours experienced by a boat shaped strap hole subjected to a load of 1000 pounds.

Referring now specifically to FIGS. 10–12, a second alternative embodiment of a one-piece bracket member 516 and corresponding strap member 510 is shown. The strap member 510 is generally manufactured to have the same structure as the strap member of FIG. 3. There are three generally parallel band members 512A, 512B, 512C which are separated by longitudinally extending slots 528 which are separated by transversely aligned ties 530. One end 532B of the middle band member 512B extends beyond the ends 532A, 532C of the outside band member 512A, 512C. At the opposed end of the strap member 510, the opposed ends 534A, 534C of the outside band members 512A, 512C extend beyond opposed end 534B of the middle band member 512B. Longitudinally oriented boat-shaped slots 536 are located on the three band members 512A, 512B, 512C, extending therethrough. Referring specifically to FIG. 12, the boat-shaped slot 536 is a hybrid longitudinal slot formed from an elliptical curve 535 on one end and an oval curve 537 on the opposed end of the slot. The hybrid boat-shape 536 formed from an elliptical curve 535 and an oval curve 537 is designed to accommodate high stress levels at the rear of the connection with respect to the load applied. It has been noted that an elliptical shape does not fare well when subjected to brute force gross overloading in that the narrow curve of the ellipse tends to shear off at a 45 degree angle. Thus, the boat-shaped hybrid 536 as shown in FIG. 12 creates a design wherein the oval curve 537 presents a larger area to counteract the shear forces and an elliptical tapered section 535 where the strap stress is multiplied in a non-shear fashion. As shown in FIG. 19, the boat-shaped slots 536 will accommodate the stresses encountered by the slot in a different manner at each specified curved end of the slot. The stress contours shown in FIG. 19 indicate that the highest stretching forces felt by the elliptical end of the boat-shape are 4.500E+04 or 45,000 psi while the highest stretching forces felt by the oval curve at the opposed end of the slot are equivalent to 8.592E+04 or 85,920 psi, found at the "corners" of the oval curve (the area where the oval curve meets the substantially straighter edged sides). As with the embodiment shown in FIG. 3, each slot 536 may be coined about its perimeter (not shown) to prestress the material around the perimeter of the slot 536 thereby providing the ability to limit any stress fractures which may occur in the prestressed perimeter during use of the band and preventing such fractures from progressing into the body of each band member 512A, 512B, 512C. Further, in the embodiment shown in FIG. 11, the holes 537 to which the apply member 520 is attached are generally circular in shape and coined. However, it is envisioned that such holes 537 may be designed to be longitudinal and boat-shaped as are the remaining slots 536.

Referring now to FIG. 10, the one-piece bracket member intended for use with the band of FIG. 11 is shown in detail. The bracket member 516 has generally the same structure as the bracket member 16 described earlier with reference to FIG. 5 and is formed to have the same radial curvature as the strap member 510. The bracket member 516 includes a reaction member 522, apply member 520 and connector member 524. The bracket member 516 includes a plurality of boat-shaped longitudinal extrusions 540 located in the reaction member 522 and a connector member 524. The apply member 520 includes a pair of circular extrusions 541. The extrusions 540, 541 are formed by locally extruding the bracket material through the inner peripheral surface (not shown) of the bracket member 516 to create a series of tabs (not shown). Preferably, the tabs are designed to mate with the slots 536 and holes 537 of the strap member 510 and extend therethrough. The tabs preferably have a clearance of 0.0015 inches per side with the slots 536, 537 to enhance the positioning of the bracket member 516 upon the strap member 510. The extruded tab members have the structural detail described and shown in FIG. 7 and the manner in which the bracket member 516 is aligned with the band members 512A, 512B, 512C and the tabs are clinched to form a bead and fix the bracket member 516 to the strap member 510 is the same as that described earlier.

Figure 13:
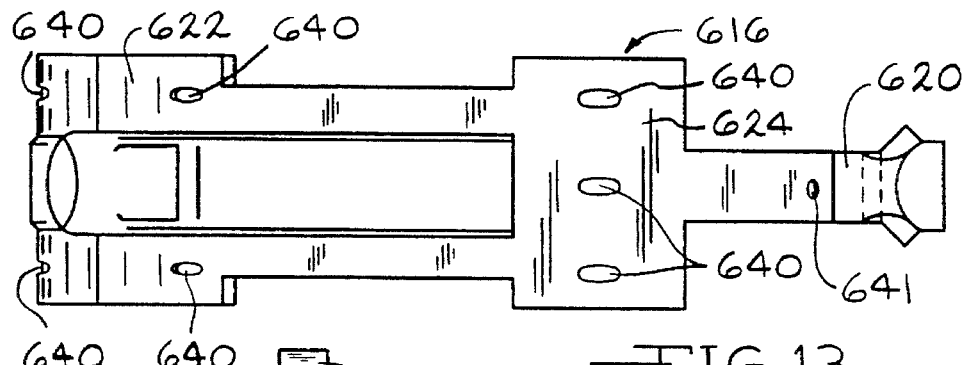
FIG. 13 is an elevational view of a third alternative embodiment of a single bracket assembly wherein the mating extrusions are elliptically shaped with oval ends.
Figure 14:
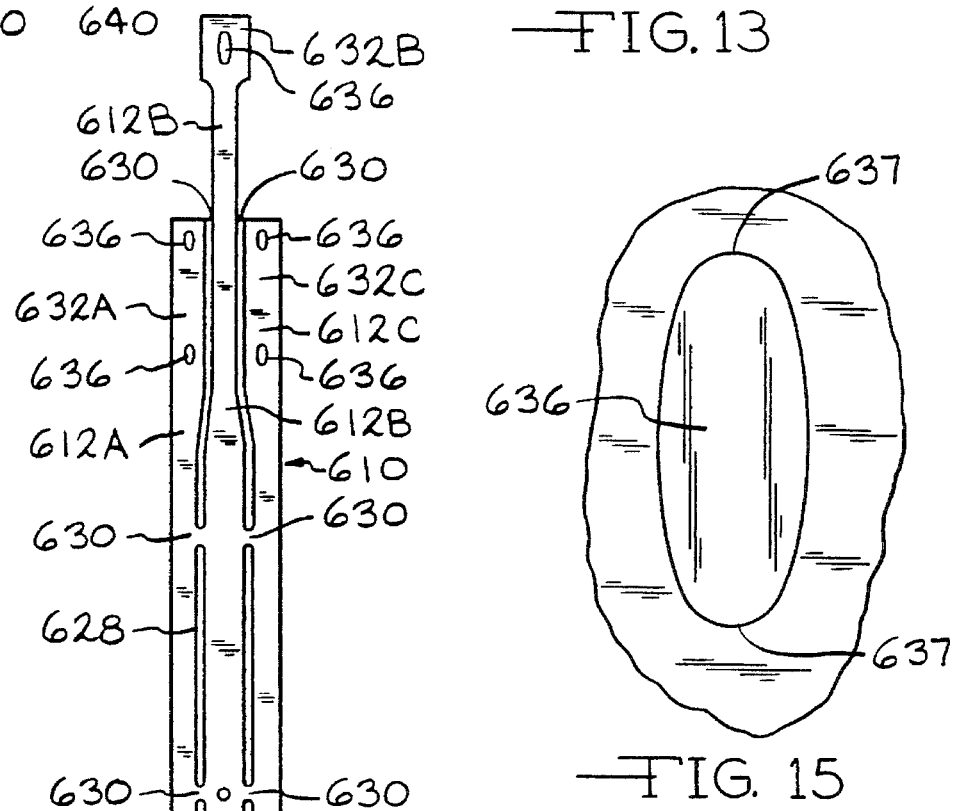
FIG. 14 is an elevational view of a third alternative embodiment of a preslotted strap member of a double wrap band having mating slots of a elliptical shape with oval ends to receive the extrusions of the bracket assembly of FIG. 13.
Figure 15:
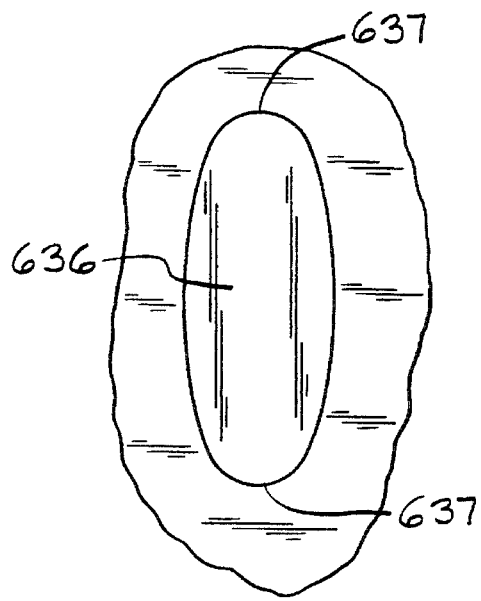
FIG. 15 is a detail view of the elliptical slot with oval ends as appears in the strap member of FIG. 14.
Figure 20:
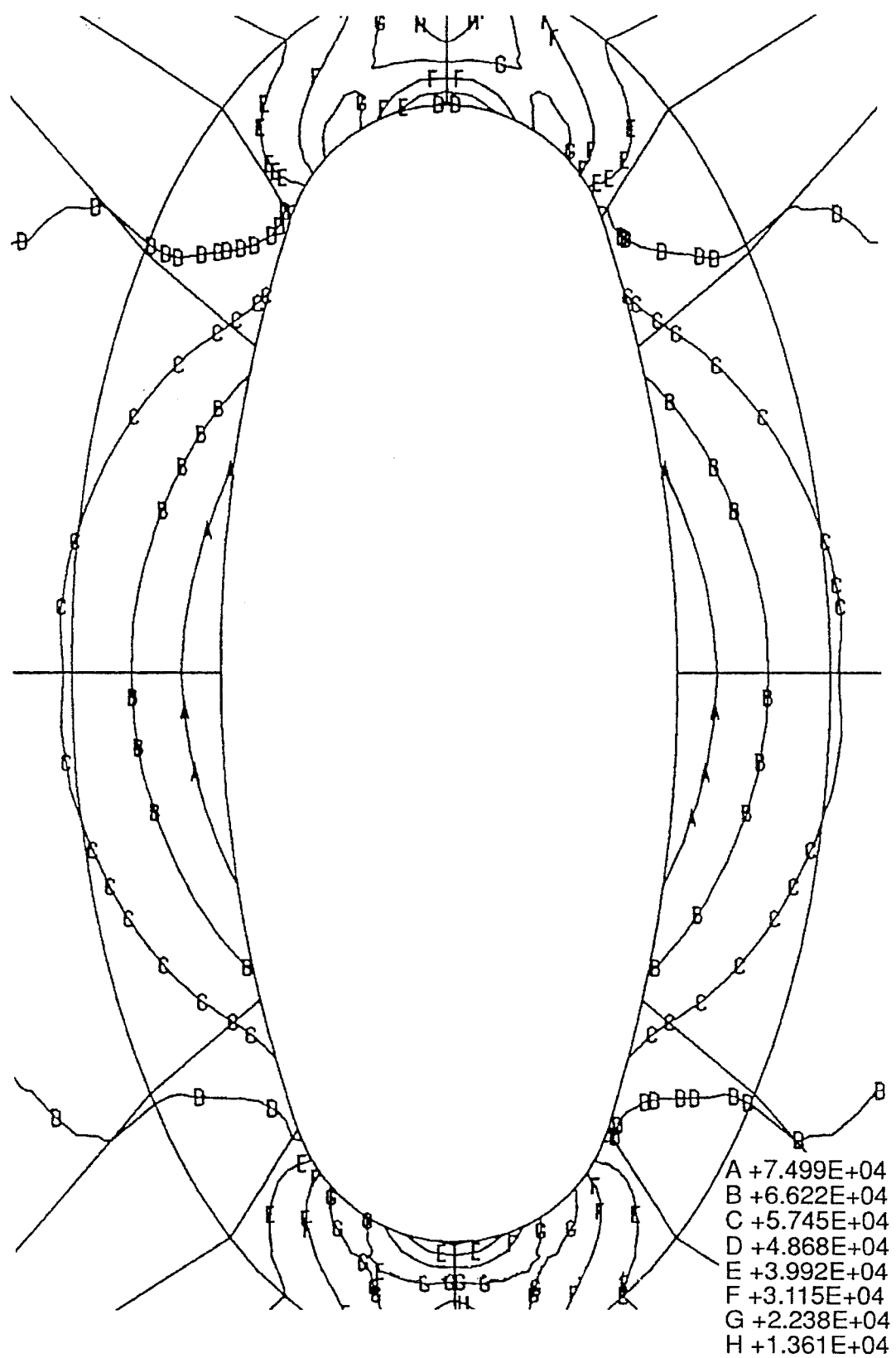
FIG. 20 is a diagrammatic vice of stress level contours experienced by an elliptical strap hole with oval ends subjected to a load of 1000 pounds.

Referring now specifically to FIGS. 13–15, a third alternative embodiment of a one-piece bracket member 616 and corresponding strap member 610 is shown. The strap member 610 is generally manufactured to have the same structure as the strap member of FIG. 3. There are three generally parallel band members 612A, 612B, 612C which are separated by longitudinally extending slots 628 which are separated by transversely aligned ties 630. One end 632B of the middle band member 612B extends beyond the ends 632A, 632C of the outside band members 612A, 612C. At the opposed end of the strap member 610, the opposed ends 634A, 634C of the outside band members 612A, 612C extend beyond the opposed end 634B of the middle band member 612B. Longitudinally oriented elliptically shaped slots with oval shaped ends 636 are located on the three band members 612A, 612B, 612C, extending therethrough. As shown in FIG. 15, the elliptical slots 636 have oval shaped ends which are designed to spread the stresses encountered by the slots over a large surface area, thereby greatly reducing the potential premature failure of the brake band. The stress contours shown in FIG. 20 indicated that the highest stretching forces felt by the ellipse with oval ends at contour lines A are equivalent to 7.499E+04 or 74,990 psi. As with the embodiment shown in FIG. 3, each slot 636 may be coined about its perimeter (not shown) to prestress the material around the perimeter of the slots 636 thereby providing the ability to limit any stress fractures which may occur in the prestressed perimeter during use of the band and preventing such stress fractures from progressing into the body of each band member 612A, 612B, 612C. Further, in the embodiment shown in FIG. 9, the holes 637 to which the apply member 620 are attached are generally circular in shape and coined. However, it is envisioned that such holes 637 may be designed to longitudinal and elliptical shaped with oval curves as are the remaining slots 636.

Referring now to FIG. 13, the one-piece bracket member intended for use with the band of FIG. 14, is shown in detail. The bracket member 616 has generally the same structure as the bracket member 16 described earlier with reference to FIG. 5 and is formed to have generally the same radial curvature as the strap member 610. The bracket member 616 includes a reaction member 626, apply member 620, and connector member 624. The bracket member 616 includes a plurality of elliptically shaped longitudinal extrusions having oval curves 640 located in the reaction member 622 and connector member 624. The apply member 620 includes a pair of circular extrusions 641. The extrusions 640, 641 are formed by locally extruding the bracket material through the inner peripheral surface (not shown) of the bracket member 616 to create a series of tabs (not shown). Preferably the tabs are designed to mate with the slots 636 and holes 637 of the strap member 610 and extend therethrough. The tabs preferably have a clearance of 0.0015 inches per side with the slots 636, 637 to enhance the positioning of the bracket member 616 upon the strap member 610. The extruded tab members may have the same structural detail as described and shown in FIG. 7 and the manner in which the bracket member 616 is aligned with the band members 612A, 612B, 612C and the tabs are clinched to form a bead and fix the bracket member 616 to the strap member 610 is the same as that discussed earlier.

Figure 21:
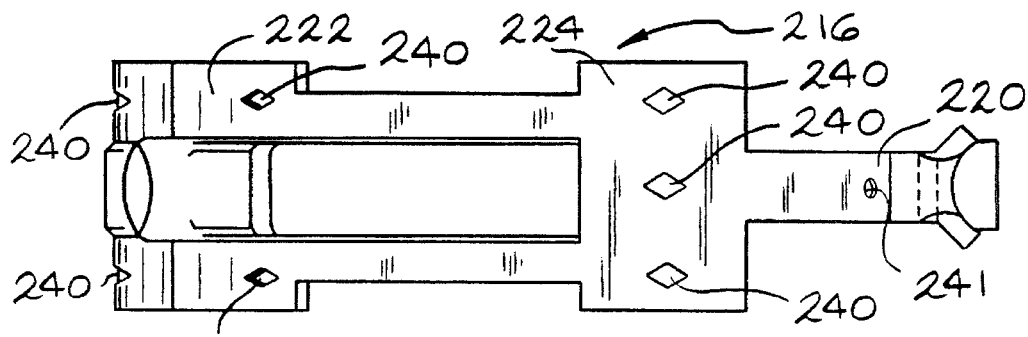
FIG. 21 is an elevational view of a fourth alternative embodiment of a single bracket assembly wherein the mating extrusions are diamond shaped.
Figure 22:
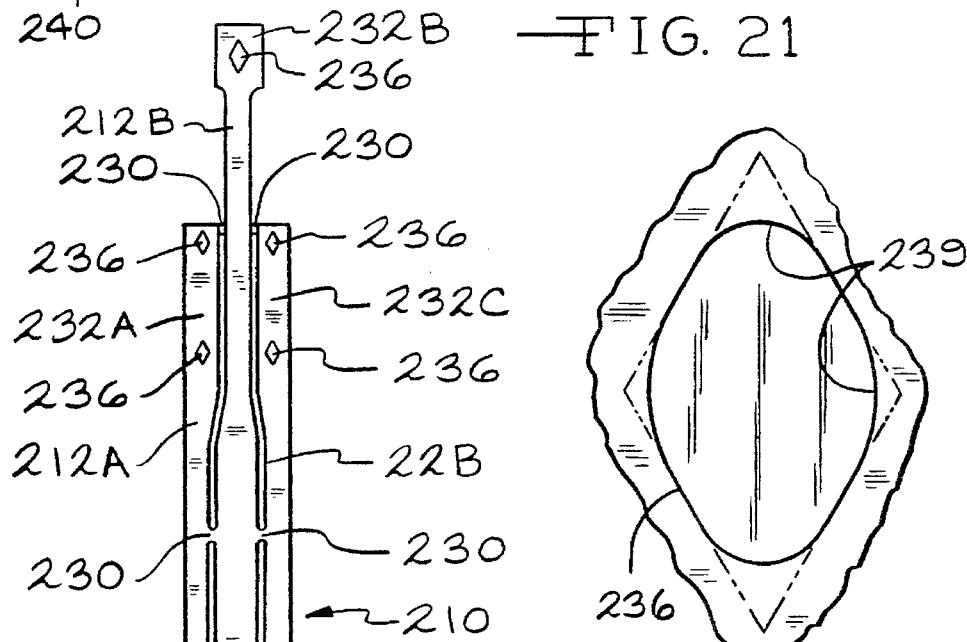
FIG. 22 is an elevational view of a fourth alternative embodiment of a preslotted strap member of a double wrap band having mating slots of a diamond shape to receive the extrusions of the bracket assembly of FIG. 21.
Figure 23:
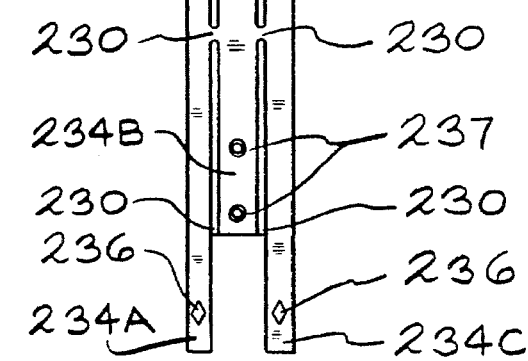
FIG. 23 is a detail view of the diamond shaped slots as appears in the strap member of FIG. 22.

Referring now specifically to FIGS. 21–23, a fourth alternative embodiment of a one-piece bracket member 216 and the corresponding strap member 210 is shown. The strap member 210 is generally manufactured to have the same structure as the embodiments described earlier with reference to FIG. 3. The longitudinally oriented slots 236, however, are diamond shaped. Preferably the slots 236 have a minor radial curve 239 as shown in FIG. 23 at each of the four corners of the diamond shape. As with the embodiments discussed earlier, the longitudinal orientation coupled with the diamond shape of the slots 236 and the radial curve at the corners of the slots 236 serves to spread the stresses encountered by each slot 236 over a larger surface area, thereby greatly reducing the potential for premature failure of the brake band. If desired, each of the slots 236 may be coined about the perimeter as has been described earlier with regard to FIG. 3. Further, the holes 237 to which the apply member 220 is attached are generally circular in shape, and, preferably, coined. However, it is envisioned that such holes 237 may also be designed to be diamond shaped as are the remaining slots 236.

Referring now to FIG. 21, a second alternative embodiment of the one-piece bracket member 216 intended for use with the strap member 210 of FIG. 22 is shown in detail. The bracket member 216 is generally structured in the same manner as the bracket members described earlier with reference to FIG. 5. The extrusions 240 of the bracket member 216 are generally diamond shaped having a minor radial curve at each of the four corners so as to cleanly mate with the diamond shaped slots 236 of the band member 210 of FIG. 22. The structure of the extruded tabs, preferably includes the same detail as that structure described earlier for those tabs referenced in FIGS. 5–7 and the manner in which the bracket member 216 is aligned with the band members 212A, 212B, 212C and the tabs are clinched to form a bead and fix the bracket member 216 to the strap member 210 is the same as that described earlier.

Figure 24:
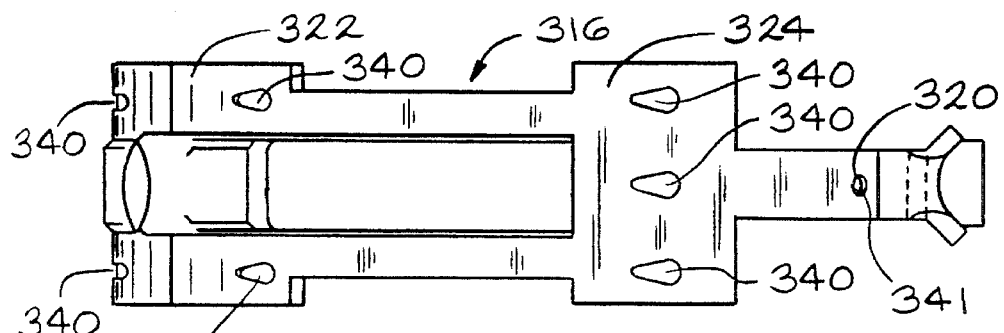
FIG. 24 is an elevational view of a fifth alternative embodiment of a single bracket assembly wherein the mating extrusions are tear drop shaped.
Figure 25:
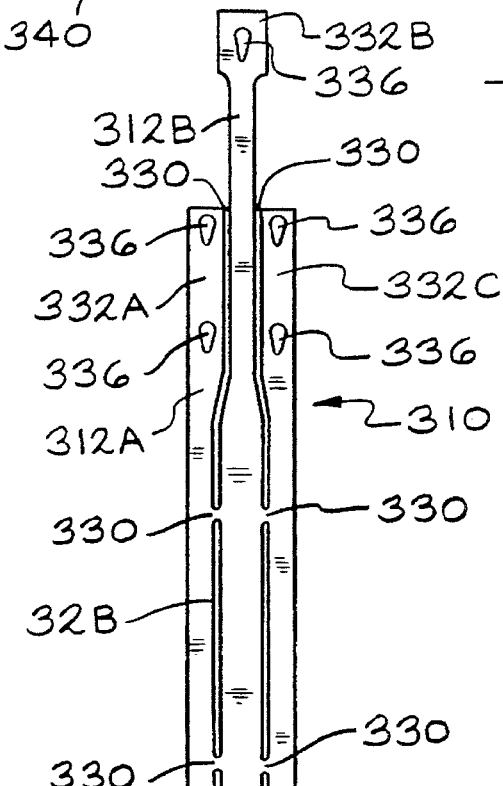
FIG. 25 is an elevational view of a fifth alternative embodiment of a preslotted strap member of a double wrap band having mating slots of a tear drop shape to receive the extrusions of the bracket assembly of FIG. 24.

Referring now specifically to FIGS. 24 and 25, a fifth alternative embodiment of a one-piece bracket member 316 and the corresponding strap member 310 is shown. Again, as with the embodiments described earlier with reference to FIG. 3, the structure of the strap member 310 remains generally unchanged with the exception of the slots 328 having the shape of tear drops. The structure of the bracket member 316 remains generally unchanged from the structure described earlier with reference to FIGS. 5–7. The bracket member 316 includes corresponding tear drop shaped extrusions 340 intended to mate with the slots 328 of the strap member 310.

Referring now to FIGS. 26 and 27, a sixth alternative embodiment of a bracket member 416 and a corresponding strap member 410 is shown. The structure of the strap member 410 remains generally unchanged from the structure of the embodiments described earlier with reference to FIG. 3 with the exception of the slots 428 which are clover shaped, The structure of the bracket member 416 remains generally unchanged from the structure described earlier with reference to FIGS. 5–7. The bracket member 416 includes corresponding clover shaped extrusions 440 intended to mate with the slots 428 of the strap member 410.

The variety of embodiments described herein each provide specific operational characteristics when exposed to differentiated types of loads such as high cycle fatigue loads and brute force gross overload holding power loads and other load combinations which may fall between the extremes. The variety of embodiments disclosed herein allow one skilled in the art to optimize the load bearing shape of the extrusion and strap hole to a specific set of application requirements while tending to the tedium of economic restraints.

Therefore, the above description of the variety of embodiments is not intended to offer a preferred embodiment, but rather is intended to teach a variety of design choices which may be alternatively preferred, depending upon the specific required application.

We claim:

1. A double wrap brake band comprising, in combination:
a strap member (10) composed of three longitudinally extending bands (12A, 12B, 12C) of a specified thickness and having an inner peripheral surface (15) joined together in a generally parallel relationship as two outside bands (12A, 12C) and a middle band (12B) to form a substantially annular configuration by a bracket member (16) having an annular inner peripheral surface (42); said bracket member (16) including an apply member (20) secured to one end (34B) of the middle band (12B), a reaction member (22) secured to the ends (32A, 32C) of the outside bands (12A, 12C) which are opposed in relationship to the end (34B) of the middle band to which the apply member (20) is secured, and a connector member (24) secured to the remaining free ends (34A, 32B, 34C) of the three bands (12A, 12B, 12C); wherein said strap member (10) includes a plurality of non-circular shaped slots (36), each slot defining a perimeter edge (38) and extending through said strap member (10); said bracket member (16) including a plurality of extruded non-circular tabs (44) extending from the inner peripheral surface (42) of said bracket member (16) for positioning within said slots (36) to engage said slots (36) and extend beyond said inner peripheral surface (15) of said strap member (10), each of said tabs (44) being extruded such that each of said tabs (44) has a longitudinal curvature that is substantially radially parallel to the annular inner peripheral surface (42) of said bracket member (44) and the annular inner peripheral surface (15) of said strap member (10).

2. The brake band of claim 1, wherein each of said slots (36) is prestressed about its perimeter (38).

3. The brake band of claim 1, wherein said apply member (20), said reaction member (220), and said connector member (24) are structurally independent components.

4. The brake band of claim 1, wherein said slots (36) are oval-shaped, such oval-shape being longitudinally oriented on said strap member (10) and said tabs (44) have an oval-shape designed to mate with said oval-shape of said slots (36).

5. The brake band of claim 1, wherein said slots (136) are elliptical-shaped, such elliptical shape being longitudinally oriented on said strap member (110) and said tabs (144) have an elliptical-shape designed to mate with said elliptical-shaped slots (136).

6. The brake band of claim 1, wherein said slots (236) are generally diamond-shaped and said tabs (244) are generally diamond-shaped and designed to mate with said slots (236).

7. The brake band of claim 6, wherein said diamond-shape of said slots (236) and tabs (244) includes small radial curves located at the apexes of said diamond shape.

8. The brake band of claim 1, wherein said slots (336) are generally tear drop shaped, such tear drop shape being longitudinally oriented on said strap member (310) and said tabs (344) have a tear drop shape designed to mate with said tear drop shaped slots (336).

9. The brake band of claim 1, wherein said slots (446) are generally clover-shaped and said tabs (444) have a clover shape designed to mate with said clover-shaped slots (436).

10. The brake band of claim 1, wherein said slots (536) are boat-shaped having an elliptical curve (535) at one end of such longitudinally oriented slot and an oval curve (537) at the opposed end of such slot and said tabs (544) have a boat shape designed to mate with said boat-shaped slots (536).

11. The brake band of claim 1, wherein said slots (636) are elliptical in shape with oval-like curves located at each end of such longitudinal elliptical slot and said tabs (644) have a matching shape designed to mate with said slots (636).

* * * * *